US008565798B2

(12) United States Patent
Parker

(10) Patent No.: US 8,565,798 B2
(45) Date of Patent: Oct. 22, 2013

(54) GEO-DIRECTED ADAPTIVE ANTENNA ARRAY

(75) Inventor: Michael N. Parker, Tucson, AZ (US)

(73) Assignee: Rincon Research Corporation, Tucson, AZ (US)

( * ) Notice: Subject to any disclaimer, the term of this patent is extended or adjusted under 35 U.S.C. 154(b) by 688 days.

(21) Appl. No.: 12/843,531

(22) Filed: Jul. 26, 2010

(65) Prior Publication Data

US 2012/0021687 A1 Jan. 26, 2012

(51) Int. Cl.
*H04B 7/00* (2006.01)

(52) U.S. Cl.
USPC .... 455/501; 455/63.1; 455/67.13; 455/114.2; 375/327; 342/181

(58) Field of Classification Search
USPC .......... 455/501, 63.1, 67.13, 114.2, 222, 296, 455/562.1; 375/327, 324; 342/181, 174
See application file for complete search history.

(56) References Cited

U.S. PATENT DOCUMENTS

| | | | | |
|---|---|---|---|---|
| 6,148,219 | A * | 11/2000 | Engelbrecht et al. | 455/456.2 |
| 6,157,340 | A * | 12/2000 | Xu et al. | 342/174 |
| 6,734,824 | B2 * | 5/2004 | Herman | 342/465 |
| 7,206,444 | B2 * | 4/2007 | Herman | 382/154 |
| 7,304,605 | B2 * | 12/2007 | Wells | 342/357.62 |
| 7,626,546 | B2 * | 12/2009 | Chung et al. | 342/465 |
| 7,911,376 | B2 * | 3/2011 | Hardacker et al. | 342/174 |
| 7,974,627 | B2 * | 7/2011 | Mia et al. | 455/440 |
| 8,134,493 | B2 * | 3/2012 | Noble et al. | 342/107 |
| 8,174,444 | B2 * | 5/2012 | Parker | 342/378 |
| 8,188,919 | B2 * | 5/2012 | Grabbe et al. | 342/450 |
| 8,358,239 | B2 * | 1/2013 | Krich et al. | 342/174 |
| 2004/0027276 | A1 * | 2/2004 | Herman | 342/181 |
| 2004/0028270 | A1 * | 2/2004 | Herman | 382/154 |
| 2004/0157645 | A1 * | 8/2004 | Smith et al. | 455/562.1 |
| 2005/0162305 | A1 * | 7/2005 | Wells | 342/357.02 |
| 2011/0001658 | A1 * | 1/2011 | Noble et al. | 342/107 |
| 2011/0074631 | A1 * | 3/2011 | Parker | 342/378 |
| 2011/0241931 | A1 * | 10/2011 | Krich et al. | 342/159 |
| 2011/0287779 | A1 * | 11/2011 | Harper | 455/456.1 |
| 2012/0121043 | A1 * | 5/2012 | Wambacq | 375/327 |
| 2012/0229337 | A1 * | 9/2012 | Parker | 342/378 |

OTHER PUBLICATIONS

S. Ellingson, "Fun with TBN", Long Wavelength Array Memo Series, http://www.ece.vt.edu/swe/lwa/memo/lwa0184.pdf, Version 1, Sep. 13, 2011, pp. 1-20.

* cited by examiner

*Primary Examiner* — Minh D Dao
(74) *Attorney, Agent, or Firm* — Michael J. Curley; Quarles & Brady LLP

(57) ABSTRACT

Systems and methods for on-the-fly characterization of an arbitrary array of antenna elements are provided. An array of arbitrary antenna elements and a reference receiver is provided. A location for a target source of signals is provided or assumed. Cross ambiguity functions are computed between the signal received by the reference receiver and the signal received by each antenna element. The cross ambiguity functions are analyzed to determine the phase and amplitude response of the antenna array to signals originating from the location of the target source of signals.

21 Claims, 7 Drawing Sheets

GEO-DIRECTED ADAPTIVE ANTENNA ARRAY

FIELD OF THE INVENTION

The invention relates to methods and systems for forming antenna arrays to isolate radio signals originating from a fixed or slowly moving geographical location in a crowded signal environment.

BACKGROUND OF THE INVENTION

As the use of electronic devices that transmit and receive radio frequency signals increases, so does the problem of isolating signals of interest in interference. This is particularly true in dense urban environments where frequency reuse is becoming common and more tightly packed users of radio spectrum compete for finite bands of spectrum. Cities, for example, may be home to many transmitters using the Wi-fi, Wi-max, TV "white space" bands, etc. Given the close proximity of these transmitters to one another, isolating a particular transmitter of interest among interfering signals is a challenge.

An illustrative example of the problem is cellular towers. Cellular towers in a city may re-use the same frequency on towers arranged in a grid only a mile apart. In a city of one hundred square miles, there may be as many as 100 cellular towers operating on the same frequency. In this simple example, the desired signal, that is a hypothetical signal of interest, is almost never the strongest signal on a particular frequency. There could be 99 other interfering signals to contend with. Additionally, the signal of interest may be so weak as to be below the receiver's noise level if a low-gain antenna is used.

One conventional solution to the problem of how to "dig" a signal of interest out of interfering signals is the use of adaptive beam-forming and interference cancelling antennas. Such antennas are conventionally constructed of multiple spaced-apart antenna elements. The relative location of all the elements of a conventional array are tightly fixed and well-characterized. The time and/or phase delay between conventional antenna array elements is also well-characterized.

For a conventional antenna array, a signal from a given transmitter is received at the various antenna elements. The signal as it is received at the various antenna elements is time-delayed (or equivalently, for narrow-band signals, experiences a phase shift) according to the amount of distance the signal had to travel from the transmitter to the various antenna elements. When the signals from the various antenna elements in the conventional array are summed, the signals from the various antenna elements can interfere either destructive or constructively. The delay between antenna elements can be controlled, either by the physical spacing between the elements, or by the addition of delay elements, to provide constructive additive combination to occur for signals from one location, while destructive additive combination (nulls) occur for signals from other locations.

In this way, conventional antenna arrays have been constructed where a beam (that is, a direction for which signals will be constructively added) can be formed and pointed in a desired direction. This improves the signal-to-white noise power ratio by the number of antenna elements coherently combined. However, interfering signals can still enter through the array sidelobes and the edge of the main beam. One way to cancel interfering signals in conventional antenna arrays is to form multiple beams orthogonal to the beam pointed at the target. The beam and its orthogonal beams are then adaptively combined with a feedback circuit controlling the gain and phase weighting of the many beams to form nulls in the composite pattern of energy that are not co-located with a location along the desired direction.

The disadvantage of conventional antenna arrays is the calibration required of the array. For conventional antenna arrays, the gain and phase characteristics of the antenna elements and the receiver channels must be known. In order to form beams with −20 dB nulls at specific spatial locations, calibration to approximately 6 degrees in phase and 10% in amplitude is generally required. Deeper nulls require even more precise phase and amplitude calibration. This is achieved conventionally by careful attention to receiver phase properties and inserting calibration signals immediately after the antenna elements to calibrate the respective receiver channels. Likewise, the placement of the antenna elements and multipath reflections must be carefully controlled.

The elaborate calibration and tightly controlled placement necessary for the operation of conventional antenna arrays is complex and expensive. What is needed is a method of picking an individual signal out of a crowded frequency space with an array of arbitrary receivers whose relative position and phase characteristics are not known a priori.

SUMMARY OF THE INVENTION

Methods and systems according to embodiments of the invention use signals or interference from a specified or dynamically located geographic target location to calibrate an array of arbitrary receivers and drive adaptation algorithms. Embodiments of the invention form beams and/or null interfering signals using receiver elements that are not initially calibrated for electronic characteristics and that may have arbitrary physical locations. Embodiments of the invention accomplish this both with and without information about the physical location of the source of signal of interest or the source of interference. Calculations of the differential amplitude and phase of a signal received from a source at receiving elements can be used to form a beam directed at a specific location from uncalibrated and arbitrarily located antenna elements. The target, that is the source of signals, may be fixed or moving. Interference from other signal sources at other locations, or at other polarizations, is adaptively nulled by antennas according to embodiments of the invention.

In one embodiment, a system for detecting signals from a known geographic location is provided. The system includes a reference receiver having an output and a plurality of antenna elements. Each antenna element includes an output. The system also includes a phase delay element in electronic communication with the output of the reference receiver, a plurality of phase delay elements in electronic communication with the outputs of each of the antenna elements, a frequency shifting element in electronic communication with the output of the reference receiver, and a cross ambiguity generation module. The cross ambiguity function ("CAF") generation module is in electronic communication with the output of the reference receiver and the outputs of the antenna elements. The cross ambiguity generation module computes a plurality of cross ambiguity functions between a delay and frequency shifted signal from the reference receiver and signals output from each of the plurality of antenna elements.

In alternative embodiments, the reference receiver is in motion with respect to the known geographic location. In certain embodiments, the system includes a cross ambiguity analysis module for analyzing the cross ambiguity functions to determine the relative phase delay of signals received from the known geographic location by the plurality of antenna elements.

Certain embodiments include an adjustment module in electronic communication with a plurality of antenna tuners, which are in turn in electronic communication with the plurality of antenna elements. The adjustment module directs a shift of the output of each of the antenna elements by an amount of phase and gain required to constructively interfere signals received by the antenna elements from the geographic location. Certain embodiments include an integration module in electronic communication with each of the antenna elements for adding phase shifted signals from each of the plurality of antenna elements resulting in a summed output.

Certain embodiments include storage in electronic communication with the cross ambiguity generation module. In certain embodiments, the storage is also in electronic communication with a cross ambiguity analysis module and an adjustment module.

Certain embodiments provide a method for focusing an antenna array toward a signal source. The method includes providing a signal source location, providing a reference receiver having a known positional relationship with the signal source location, providing a plurality of antenna elements, receiving a signal at the reference receiver, receiving a signal at each of the antenna elements, cross correlating the signal received at the reference receiver with the signal received at each of the antenna elements resulting in a cross ambiguity function for each antenna element, and analyzing the cross ambiguity functions to determine the location in time-difference-of-arrival (TDOA) and frequency-difference-of-arrival (FDOA) space for each antenna element for the signal source location.

Certain embodiments include comparing cross ambiguity functions for each antenna element to determine the relative phase shift and amplitude of a signal received at each antenna location from the signal source location. Other embodiments include applying a phase and/or gain shift to a signal received by each of the antenna elements to allow for constructive interference of signals originating from the signal source location when signals received by the antenna elements are summed. Other embodiments include summing the phase and/or gain shifted outputs of the antenna elements.

Some embodiments are directed to a method of cancelling interference received by an array of antenna elements from a source of interference having a known location. The method includes providing an interference source location, providing a reference receiver having a known positional relationship with the interference source location, providing a plurality of antenna elements, receiving a signal at the reference receiver, receiving a signal at each of the antenna elements, cross correlating the signal received at the reference receiver with the signal received at each of the antenna elements resulting in a cross ambiguity function for each antenna element, and analyzing the cross ambiguity functions to determine the location in TDOA/FDOA space for each antenna element for the interference source location.

In certain embodiments, cross ambiguity functions for each antenna element are compared to determine the relative phase shift of a signal received at each antenna location from the interference source location. Some embodiments include applying a phase and amplitude shift to a signal received by each of the antenna elements to cause destructive interference of signals originating from the interference source location when signals received by the antenna elements are summed. Some embodiments include summing the phase and amplitude shifted outputs of the antenna elements.

Certain embodiments include a method of characterizing the response of an antenna array having a plurality of antenna elements. The method includes providing a reference receiver, receiving a signal at the reference receiver, and receiving a signal at each of the plurality of antenna elements. The method also includes computing a cross-ambiguity function between the reference receiver and each antenna element resulting in an array of cross-ambiguity functions, identifying a region in each of the cross-ambiguity functions of the array corresponding to a source of signals; and analyzing the region in each of the cross-ambiguity functions of the array to determine the relative phase and gain response of the plurality of antenna elements.

Certain embodiments include subjecting the signal received at the reference receiver to a frequency shift or delay prior to computing a cross-ambiguity function between the reference receiver and each antenna element. Some embodiments include identifying a region in each of the cross-ambiguity functions of the array corresponding to a source of signals is based on data regarding the physical location of a source of signals. In certain embodiments, location and motion of said reference receiver and said antenna array are known.

In certain embodiments, an antenna having a plurality of antenna elements is adjusted by providing a reference receiver, receiving a signal at the reference receiver, receiving a signal at each of the plurality of antenna elements, computing a cross-ambiguity function between the reference receiver and each antenna element resulting in an array of cross-ambiguity functions, identifying a region in each of the cross-ambiguity functions of the array corresponding to a source of signals, and analyzing the region in each of the cross-ambiguity functions of the array to determine the relative phase and gain response of the plurality of antenna elements. Based on the analyzing step, the method involves computing phase and gain adjustments to apply to the signals received at each of the plurality of antenna elements, and applying the computed phase and gain adjustments to apply to the signals received at each of the plurality of antenna elements.

Other embodiments include subjecting the signal received at the reference receiver to a frequency shift or delay prior to computing a cross-ambiguity function between the reference receiver and each antenna element. Other embodiments involve identifying a region in each of the cross-ambiguity functions of the array corresponding to a source of signals is based on data regarding the physical location of a source of signals. Certain embodiments include summing the signals received at each of the plurality of antenna elements.

In some embodiments the computed phase and gain adjustments result in constructive interference for a signal from the source of signals when the signals received at each of the plurality of antenna elements are summed. In certain embodiments the computed phase and gain adjustments result in destructive interference for a signal from the source of signals when the signals received at each of the plurality of antenna elements are summed. In some embodiments, the computed phase and gain adjustments result in a beam pointed in the direction of the source of signals. For certain embodiments, the computed phase and gain adjustments result in a null pointed in the direction of the source of signals. In certain embodiments, location and motion of said reference receiver and said antenna array are known. In some embodiments, either the reference receiver or the plurality or antenna elements is moving along a known path with respect to the source of signals.

Certain embodiments provide a method of iteratively nulling interference with an antenna array having a plurality of antenna elements. The method includes providing a reference receiver, computing a first set of cross-ambiguity functions between the reference receiver and each of the antenna elements, analyzing the cross-ambiguity functions to distinguish a first interfering signal peak present in all cross-ambiguity functions, and analyzing the first distinguished peak in each of the cross-ambiguity functions to determine the relative phase and gain response of the plurality of antenna elements. Based on the analyzing step the method involves computing phase and gain adjustments to apply to the signals received at each of the plurality of antenna elements, applying the computed phase and gain adjustments to apply to the signals received at each of the plurality of antenna elements such that a null is formed in the direction of the first distinguished peak, and computing a second set of cross-ambiguity functions between any combination of antenna elements having a null directed at the first interferer.

Certain embodiments include analyzing the second set cross-ambiguity functions to distinguish a second interfering signal peak present in all cross-ambiguity functions, and analyzing the second distinguished peak in each of the cross-ambiguity functions to determine the relative phase and gain response of the plurality of antenna elements. Based on the analyzing step, some embodiments call for computing phase and gain adjustments to apply to the signals received at each of the plurality of antenna elements, and applying the computed phase and gain adjustments to apply to the signals received at each of the plurality of antenna elements such that a null is formed in the direction of the second distinguished peak.

Certain embodiments involve computing a third set of cross-ambiguity functions between the reference receiver and each combination of the antenna elements having nulls in the direction of the first and second interferers, analyzing the cross-ambiguity functions to distinguish a signal of interest peak present in all cross-ambiguity functions, and analyzing the distinguished signal of interest in each of the cross-ambiguity functions to determine the relative phase and gain response of the plurality of antenna elements. Based on the analyzing step, certain embodiments call for computing phase and gain adjustments to apply to the signals received at each of the plurality of antenna elements, and applying the computed phase and gain adjustments to apply to the signals received at each of the plurality of antenna elements such that a beam is formed in the direction of the signal of interest peak while nulling interference.

Certain embodiments include subjecting the signal received at the reference receiver to a frequency shift or delay prior to computing a cross-ambiguity function between the reference receiver and each antenna elements. In some embodiments, location and motion of said reference receiver and said antenna array are known. In certain embodiments, either the reference receiver or the plurality of antenna elements is moving along a known path with respect to the source of signals.

Embodiments include a method of geolocating a source of signals with an antenna array having a plurality of antenna elements. Certain embodiments include providing a reference receiver, computing a first set of cross-ambiguity functions between the reference receiver and each of the antenna elements, analyzing the cross-ambiguity functions to distinguish a first interfering signal peak present in all cross-ambiguity functions and analyzing the first distinguished peak in each of the cross-ambiguity functions to determine the relative phase and gain response of the plurality of antenna elements. Based on the analyzing step, embodiments provide for computing phase and gain adjustments to apply to the signals received at each of the plurality of antenna elements, and applying the computed phase and gain adjustments to apply to the signals received at each of the plurality of antenna elements such that a null is formed in the direction of the first distinguished peak, computing a second set of cross-ambiguity functions between any combination of antenna elements having a null directed at the first interferer, analyzing the second set cross-ambiguity functions to distinguish a second signal peak present in all cross-ambiguity functions, and analyzing the TDOA and FDOA of the second peak to determine its geographical location.

Advantages of the invention include the ability to dramatically relax the phase and/or amplitude calibration requirements of an antenna element. Additionally, embodiments of the invention allow receiving antenna elements to be arbitrarily and/or imprecisely located. In certain embodiments, the location of antenna elements can vary in a dynamic fashion. Additional advantages include the ability to sequentially null sources of interference to detect a relatively weak signal and/or to geolocate a signal after nulling interfering signals.

Additional or alternative embodiments of the invention allow for using desired sources of interference to adaptively calibrate an antenna array and form nulls in the direction of the interference. Signals remaining after all interference is nulled can then be selected for forming a collection beam.

DETAILED DESCRIPTION OF THE PREFERRED EMBODIMENTS

Figure 1:
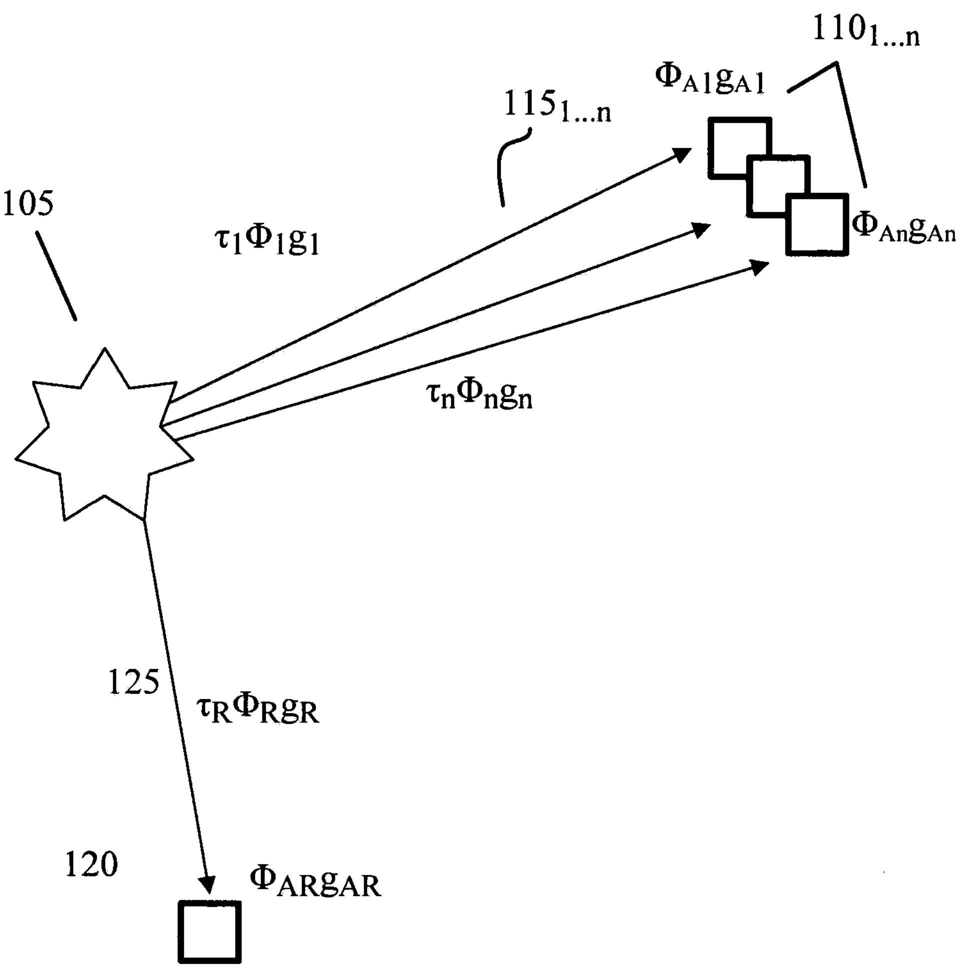
FIG. 1 is a schematic diagram showing an arrangement of transmitters and receivers according to an embodiment of the invention.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, punch card, flash memory, integrated circuits, or other digital processing apparatus memory device.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Where, "data storage media," or "computer readable media" is used, Applicants mean an information storage medium in combination with the hardware, firmware, and/or software, needed to write information to, and read information from, that information storage medium. In certain embodiments, the information storage medium comprises a magnetic information storage medium, such as and without limitation a magnetic disk, magnetic tape, and the like. In certain embodiments, the information storage medium comprises an optical information storage medium, such as and without limitation a CD, DVD (Digital Versatile Disk), HD-DVD (High Definition DVD), BD (Blue-Ray Disk) and the like. In certain embodiments, the information storage medium comprises an electronic information storage medium, such as and without limitation a PROM, EPROM, EEPROM, Flash PROM, compactflash, smartmedia, and the like. In certain embodiments, the information storage medium comprises a holographic information storage medium.

Reference is made throughout this specification to "signals". Signals can be any time varying electromagnetic waveform, whether or not encoded with recoverable information. Signals, within the scope of this specification, can be modulated, or not, according to any modulation or encoding scheme. Additionally, any Fourier component of a signal, or combination of Fourier components, should be considered itself a signal as that term is used throughout this specification.

FIG. 1 shows an exemplary transmitter-receiver arrangement according to an embodiment of the invention. The arrangement of FIG. 1 includes a transmitter 105. Transmitter 105 emits radio signals, and is located at a known position in three dimensional space. The arrangement of FIG. 1 further includes a plurality of n antenna array receiving elements $\mathbf{110}_{1 \ldots -n}$. Antenna array receiving elements are, optionally, antenna elements, receivers in electronic communication with antenna elements, or the assemblage of antenna elements, receivers connected to antenna elements, and any electronic hardware in the communication path between antenna elements and their receivers.

Antenna array receiving elements $\mathbf{110}_{1 \ldots -n}$, receive signals from transmitter 105 along paths $\mathbf{115}_{1-n}$. Any signal propagating along any of paths $\mathbf{115}_{1 \ldots -n}$ can be characterized according to a number of parameters. Any signal will experience a time delay $\tau$ associated with the propagation speed of the signal's modulation envelope, a phase delay $\Phi$, and a gain g, along the propagation path. The gain g will normally be less than one, reflecting a loss over the propagation path. FIG. 1 shows $\tau$, $\Phi$ and g associated with the various paths $\mathbf{115}_{1 \ldots -n}$.

Signals arriving at antenna array receiving elements, for example array elements $\mathbf{110}_{1 \ldots n}$ are modified according to the properties of the antenna array receiving elements. For example, the $i^{th}$ antenna array receiving element introduces an antenna gain $g_{Ai}$ and an antenna phase shift $\Phi_{Ai}$.

The arrangement of FIG. 1 also includes a separated reference receiver 120. Reference receiver 120 receives a signal from transmitter 105 along path 125. As the signal propagates from transmitter 105 to reference receiver 120, it also experiences a time delay, a phase delay and gain or loss, which are indicated. Like the antenna array receiving elements, the reference receiver also introduces its own antenna gain and phase response.

In the arrangement of FIG. 1, it will be assumed that the signal of interest is narrowband so that the propagation delay from the transmitter to the antenna array receiving elements

1101 . . . n is much smaller than 1/(signal bandwidth). While is not a requirement for the operation of embodiments of invention, it helps simplify illustration of invention.

As is shown in FIG. 1, a signal from a transmitter arrives at the ith antenna array receiving element with a delay of $\tau_i$, a phase shift of $\Phi_i$, and a gain of $g_i$. The gain and phase shift terms are a composite of the transmitter antenna pattern (i.e., is the transmit pattern isotropic or directional), spreading loss to the receive array, and phase shift due to the range to the individual receive antenna elements. Similar terms represent the delay, gain and phase at the separate reference receiver. Each individual antenna element (including the path from an individual antenna element to its respective receiver) further modifies the signal with an antenna gain and phase.

All of these quantities potentially vary with time and frequency. Reasons for time variation can range from motion of the transmitter or antenna array receiving elements, changes in their orientation, or time-varying changes in the receiver's electronic components due to temperature fluctuations, acceleration effects, power supply changes, etc. Variations with frequency are typically due to the antenna element or electronic circuit design, mutual coupling or reflections from objects (including other antenna elements), receiver filter circuits, etc.

Embodiments of the invention use a separated reference receiver, for example, separated reference receiver 120 of FIG. 1 to determine the time difference of arrival (TDOA) and a frequency difference of arrival (FDOA) between the reference receiver and each of the antenna array receiving elements. This computation is possible if the location and motion paths of the antenna array, the reference receiver and the transmitter are known. The location of the antenna array receiving elements need not be known with specificity. If the locations of the antenna array receiving elements, the reference receiver, or the transmitter are unknown, a lattice of possible locations in TDOA and FDOA space can still be computed, although the reference against which this lattice lies is undetermined. If the transmitter is fixed, and the antenna array receiving element positions are roughly known, the measured TDOA and FDOA of signals at the reference receiver and the antenna array receiving elements can be used to determine whether a received signal is emanating from a given geographical location.

Figure 2:
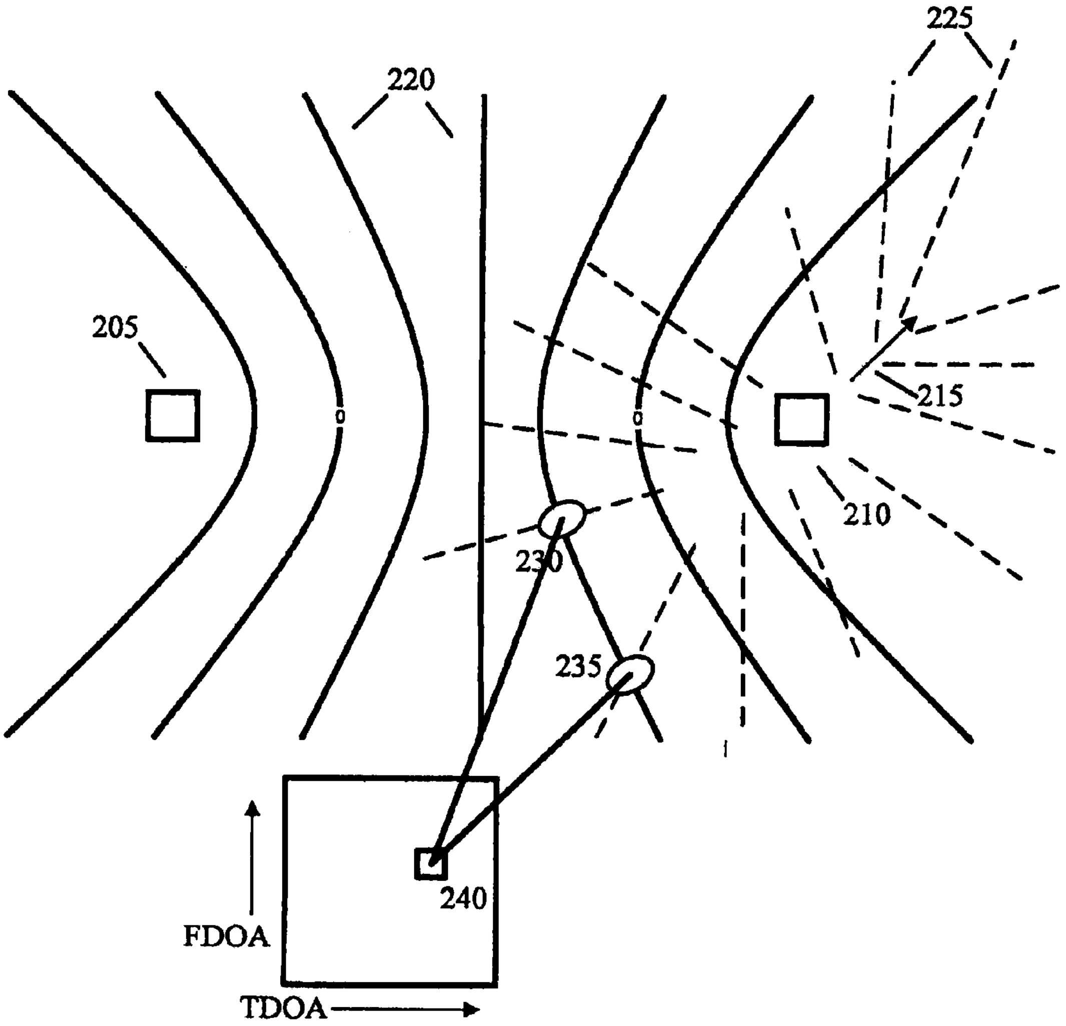
FIG. 2 is a sketch of a transmitter-receiver geometry according to an embodiment of the invention.

It is known that TDOA and FDOA measurements can be used to determine the location of a fixed signal transmitter. Cross correlation of signals received by two separated collectors can be used to create a two-dimensional ambiguity plane (the cross-ambiguity function or "CAF") displaying, in TDOA and FDOA space, the potential locations of a transmitter. FIG. 2 shows a sketch of TDOA and FDOA contours formed by two collectors (or receivers), one of which is fixed and one of which is moving. In FIG. 2 a first receiver 205 and a second receiver 210 are provided. First receiver 205 is stationary, while second receiver 210 is moving with velocity vector 215. The plane of FIG. 2 represents the surface of the earth, with moving receiver 210 moving along the surface of the earth.

TDOA measurements from a transmitter having an unknown location reveal a plurality of contours of constant TDOA 220. The contours of constant TDOA 220 represent the intersections of hyperbolic surfaces of constant TDOA with the plane of FIG. 2 or the surface of the earth. These contours represent possible locations in X-Y space, that is, on the surface of the earth, where a stationary transmitter can be located for a given TDOA. FDOA measurements between the fixed 205 and moving 210 receivers also reveal a plurality of contours of constant FDOA 225. The contours of constant FDOA 225 represent the intersections of conical surfaces of constant FDOA with the plane of FIG. 2 or the surface of the earth. These contours represent possible locations in X-Y space, that is, on the surface of the earth, where a transmitter can be located for a given FDOA. When certain simplifying assumptions are made about the geometry (e.g., assuming that the transmitter is located at the surface of the earth), the intersection of one of the FDOA and one of the TDOA contours fixes possible positions for an unknown transmitter for a given measured FDOA and TDOA. In the example of FIG. 2, two possible X-Y transmitter locations are determined 230 and 235. Additional receivers can be added to provide additional independent measurements to fix the transmitter location to one of these two locations.

Possible X-Y transmitter locations 230, 235 map to a single region 240 in an FDOA-TDOA coordinate space. In geolocation, it is the FDOA-TDOA map (called the cross-ambiguity function) that is generally generated first through cross-correlating the signals received on the receivers. Once the cross-ambiguity function has been generated, additional processing steps or assumptions are made to fix the position of an unknown transmitter. Methods for fixing the location of a transmitter using one or more moving receivers are described in co-pending application Ser. No. 12/542,541 entitled "Precision Geolocation of Moving or Fixed Transmitters Using Multiple Obsevers", the disclosure of which is incorporated herein in its entirety. In embodiments according to the invention, a reverse principle is employed. Cross-correlation is used to generate a cross-ambiguity function, which may be analyzed to resolve signal peaks corresponding to potential transmitters or sources of interference. Geographical data on potential transmitter locations and paths can be used to identify regions of interest within the CAF, that is, regions in TDOA-FDOA space that may correspond to the physical location of either a source of signals to receive, or a source of interference that needs to be cancelled. Oftentimes the region of interest in TDOA-FDOA space will coincide with a peak, which indicates the presence of a source of signals.

Once a region or signal peak in the CAF is identified, methods according to the invention are used to construct a FDOA-TDOA filter that eliminates the possibility of signals received from locations other than the location of interest, or amplifies signals received with the same FDOA-TDOA as the peak signal. In other words, if one wishes to detect a signal coming from one location or set of locations, e.g., locations 230, 235 of FIG. 2, one can selectively discriminate against signals from all other locations, or selectively bias a receiver to preferentially receive signals from the desired location. This is accomplished by using the cross-ambiguity function response at the desired location's TDOA/FDOA value to detect a signal from the desired location and compute complex weights required for the antenna array to form a sum beam pointed at the location of interest.

Figure 3A:
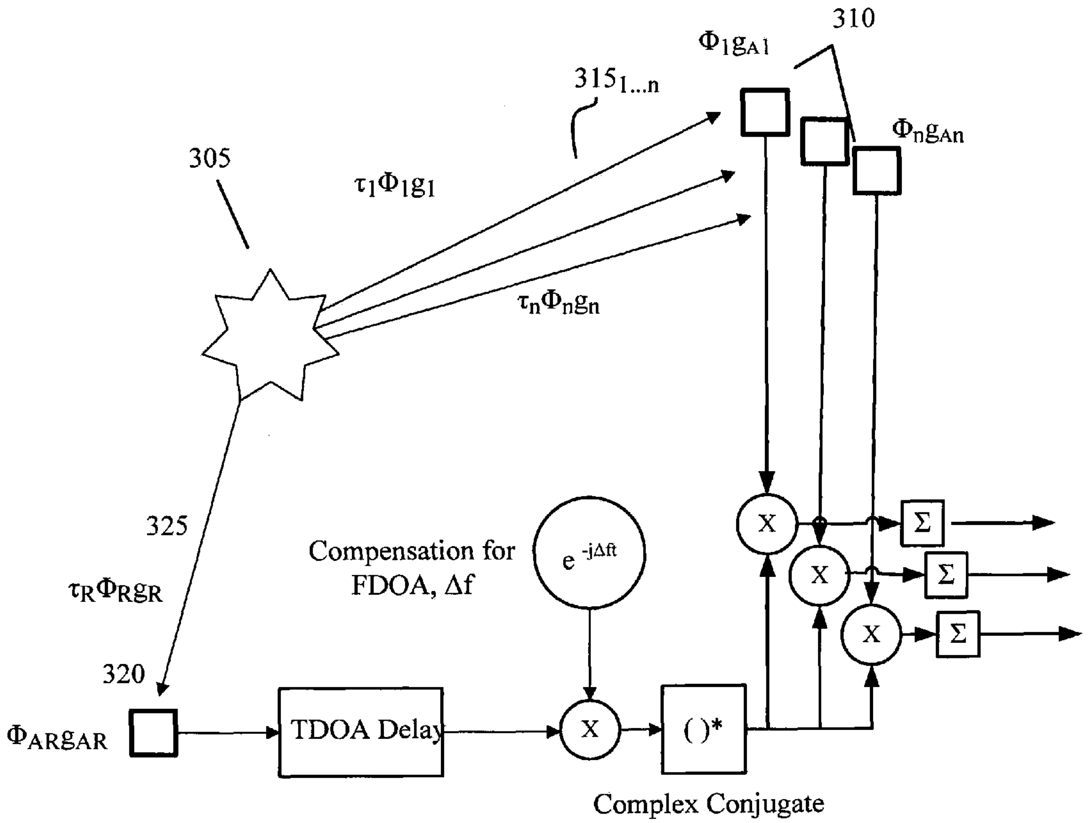
FIG. 3*a* is a schematic diagram of a signal processing system for an adaptive antenna array according to an embodiment of the invention.

FIG. 3*a* shows a conceptual arrangement for system for computing a cross-correlation function usable to direct a beam from an array of antenna elements to a specific location. Although certain elements in FIG. 3*a* have been represented as physical objects such as transmitters or antenna elements, it is important to point out that they are just as accurately thought of as signal inputs from receivers or antenna elements.

The circuit of FIG. 3*a* includes transmitter 305. Transmitter 305 broadcasts a signal along a plurality of paths $\mathbf{315}_{(1\text{-}n)}$, which are received by a plurality of n receiver antenna elements 310. As in the arrangement of FIG. 1, the receiver antenna elements may be individual antenna elements in a single antenna array, multiple widely separated receivers, or signal outputs somewhere downstream of a plurality of antenna elements. As the received signals propagate along paths $315_{(1-n)}$ the signals each experience some time delay, some amplitude gain (or loss) and some phase change, all of which are indicated. Additionally, once the signals have been received by antenna elements 310, they are impacted by properties of the antenna elements. Specifically, each of the n antenna elements introduces an antenna gain and an antenna phase response, which are indicated.

The arrangement of FIG. 3*a* also includes a reference receiver 320. Reference receiver 320 receives signals from transmitter 305 along path 325. As the signal propagates along path 325 it experiences a time delay, a phase shift and a gain (or loss), which are indicated. When the signal has been received by the reference receiver 320, the reference receiver adds its own gain and its own phase response, which are indicated. In certain embodiments, reference receiver 320 is in motion with respect to the location of the transmitter 305 along a known path. In certain embodiments, reference receiver 320 is stationary, and transmitter 305 is in motion along a known path.

In the arrangement of FIG. 3*a*, the signal received by the reference receiver 320 is subjected to a delay. The time delay shifts the signal received by the reference receiver so that it arrives at the cross-correlator, the complex multiplication and integration operations, at the same time as signals from antenna elements 310. In certain embodiments, the time delay is calculated on the basis of the known positions of the transmitter 305 and the reference receiver 320 and approximate locations of antenna elements 310. It is important to note that to the extent that some information about the location of antenna elements 310 is used in certain embodiments of the invention to delay signals from the reference receiver and signals from a given antenna element for cross-correlation, this information need only be approximate. Any residual error in synchronization will be reflected in the cross-correlation output as a shift in the TDOA peak—the peak will still be detectable, however. The precision with which the antenna element location must be known does not approach the highly accurate characterization of antenna elements that is necessary for prior art beam steering methods.

In the arrangement of FIG. 3*a*, it is assumed that the signal arrives at the reference receiver first, and so must be delayed in order to synch that signal with the signals received by the antenna elements, but that is not a requirement. A delay element could just as easily be added in-line with antenna elements 310. Thus all references to phase delay or phase shift should be construed as equivalently allowing both positive and negative shifts in time or phase.

After being time shifted, the signal from the reference receiver is frequency shifted by an amount equal to the difference in Doppler frequency of the reference antenna 320 and the antenna array 310. The information regarding the Doppler frequency shift to the reference receiver is calculated from known motion between the reference receiver and the transmitter, e.g., by moving the reference receiver along a known path or by making assumptions regarding the motion of the transmitter relative to the reference receiver. The purpose of this shift is to cause the signals arriving at the cross correlation step to be at the same Doppler frequency offset. The frequency shift is applied to the reference receiver's output by generating a complex term reflecting the required frequency shift, and then complex multiplying the complex term with the time-shifted signal from the reference receiver.

The complex conjugate of the time and frequency shifted signal is then taken and the resulting complex conjugate is then complex multiplied with the individual signals received by individual elements of the antenna array 310. Each of the resultant signals is then integrated over time to result in a cross-correlation output.

To the degree that the antenna element channels are coherent, the final summation adds signal vectors coherently over the summation interval. For a constant-amplitude signal embedded in white noise, this improves the signal to noise ratio of the correlator output in direct proportion to number of samples summed. If, as may be the case, the exact transmitter location is not known, the process described with reference to FIG. 3*a* can be repeated for many different TDOA and FDOA offsets to form a cross ambiguity function, such as is discussed above in reference to FIG. 2. Depending on the geometry, 1 or perhaps 2 locations on the earth's surface will map into a particular TDOA and FDOA correlator response.

Cross-correlating signals received by two separated antennas can detect very weak signals. Initially, this may seem counterintuitive since noise seems to add during the integration step of cross correlation. Cross correlation results in terms of the form (s1+n1)×(s2+n2)*, etc., where s and n represent the signal and noise voltage levels of the signals on various channels. If the signal to noise ratio is negative in both channels, the resulting noise is dominated by (n1×n2*) and the SNR of the product is the square root of (SNR1×SNR2). So, for example, if the SNR out of a reference antenna is −10 dB and the SNR out of an array antenna element is −30 dB, the SNR of the cross-correlation starts at −40 dB SNR. If coherence can be maintained in the channel, integration of multiple independent samples of the cross correlation improves the output SNR in a linear fashion in proportion to the time-bandwidth product of the data being integrated. So, for example, a 5 MHz bandwidth channel that is limited by white noise has 10 million independent samples per second. If this channel is coherently integrated for 0.1 seconds, 1 million independent samples are integrated for a gain in SNR of 60 dB. This raises the SNR out of the correlator to a signal to noise ratio of +20 dB.

An advantageous feature of the invention is that this integration to dig targeted signals out of noise can be done on an element by element basis for antenna elements that have not been characterized in terms of phase or amplitude response. If there is one signal present, buried in noise as described above, the location of the signal can be detected (at least in TDOA-FDOA space) by cross-correlating a single antenna element's output with the signal received by the separated reference receiver. Comparing the relative amplitude and phase of the various correlation outputs allows the deduction of differences in amplitude and phase of the target signal output from each antenna elements' signal processing channel. This is true even if the antenna element, or its associated receiver, is completely arbitrary with an unknown amplitude or phase response or with a completely unknown location within the array. As is set forth above, a signal received by two antenna elements will appear in the CAFs generated between each antenna element and the reference receiver (the plots of TDOA-FDOA space) as a peak having a width of approximately 1/bandwidth of the detected signal. The phase difference (and difference in amplitude response) between two elements in the receiving array is measured by computing the phase difference between a signal detected at a point in the ambiguity function corresponding to one element, and the identical ambiguity function point measured between the reference receiver and the second array element. In other words, the array's phase and amplitude response can be measured by comparing the phase and amplitude of the peak that is generate in the CAFs by the same signal source for different antenna elements. This allows the effective locations and phase characteristics of the receiving antenna elements to be computed, on the fly, on the basis of the known transmitter location, the known reference receiver location, and the cross correlation outputs between the signal from the reference receiver and each signal from each antenna element.

In like manner the amplitude ratio of the ambiguity functions determines the amplitude ratio of the signal between two antenna elements. This process can be repeated for individual antennal elements, and/or combinations of elements until the amplitude response of the entire array has been measured. At no point does the precise location of an array element need to be known.

Figure 3B:
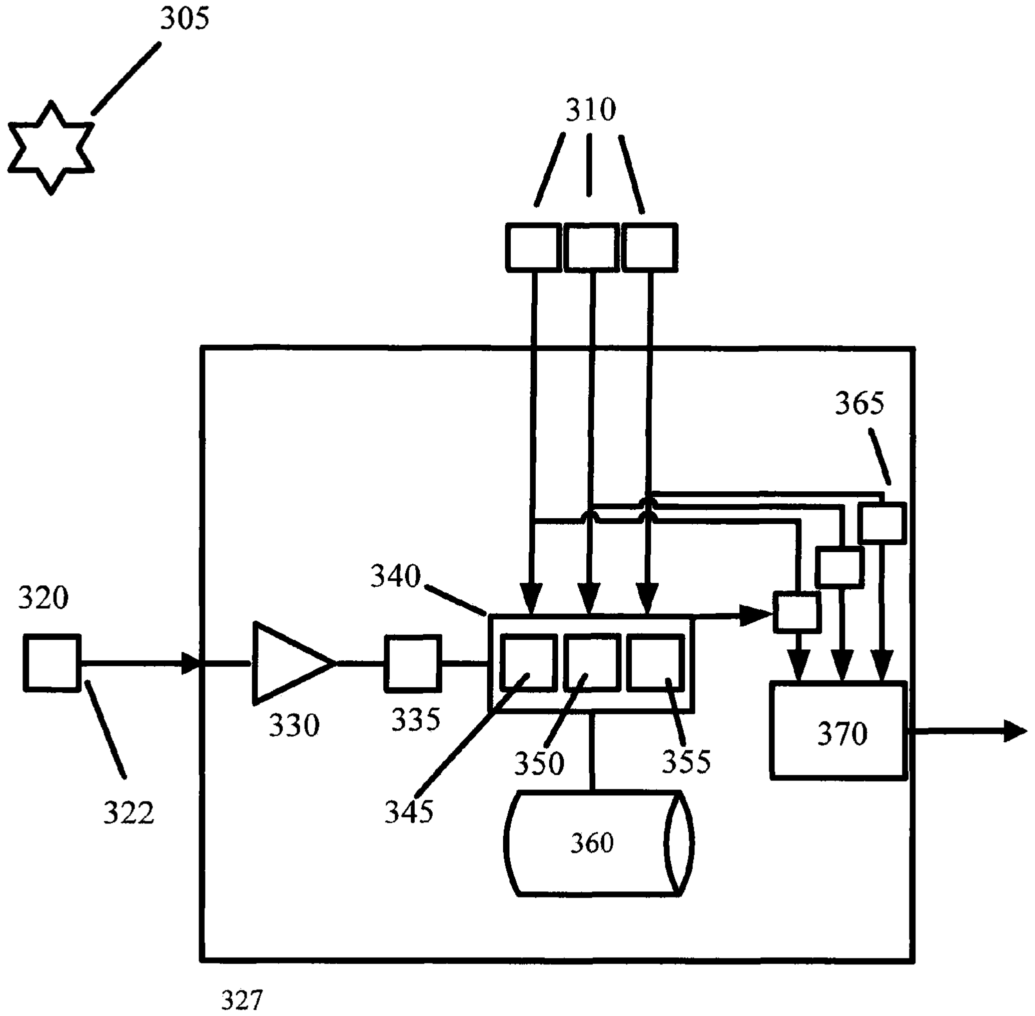
FIG. 3*b* is a schematic diagram of a signal processing system for an adaptive antenna array according to an embodiment of the invention showing additional detail.

FIG. 3*b* illustrates a system for isolating a signal from a specific geographic location using an arbitrary antenna array according to an embodiment of the invention. As in FIG. 3*a*, the system of FIG. 3*b* includes a source of signals 305, such as a transmitter, a reference receiver 320 and a plurality of antenna elements 310. The reference receiver 320 and the signal source 305 have known positions, which may be time varying with respect to one another.

Reference receiver 320 includes an output 322 which provides electronic communication between reference receiver and the other system components illustrated in FIG. 3*b*. Reference receiver output 322 is passed to delay module 330 which subjects the signal received by reference receiver 320 to a bulk time and/or phase delay and frequency and/or phase shifting module 335. Module 330 adjusts for TDOA (to an accuracy better than 1/bandwith) and module 335 adjusts the frequency of the signal received by reference receiver 320 to account for any Doppler shift and any residual phase shift introduced by motion between reference receiver 320 and signal source 305.

After being subjected to time and frequency/phase adjustment, the signal from reference receiver 320 is provided to computational module 340. Module 340 may optionally be a general or special purpose computer, a microprocessor, custom hardware, FPGAs, a co-processor, or a process running on one or more microprocessors. Module 340 includes a plurality of sub-modules in co-electronic communication: a cross ambiguity function generation module 345, a cross ambiguity function analysis module 350 and an antenna element adjustment module 355. Cross ambiguity function generation module 345 generates the cross ambiguity functions resulting from cross-correlating the signal received by reference receiver 320 with the signals received by each of antenna elements 310. Cross ambiguity function generation module 340 performs the complex conjugate, cross multiplication and integration functions described above with respect to FIG. 3*a*. The output of cross ambiguity function generation module 340 is a cross ambiguity function, that is, a 2-dimensional function in FDOA/TDOA space. A peak in the CAF occurs at the TDOA and FDOA that correspond to a source of signals being received by both the reference receiver and the antenna element in question. A particular region in the TDOA/FDOA space will correspond to the physical location of a signal source being received by both reference receiver and the antenna element in question. CAF analysis module 350 identifies this region through analysis performed using information regarding the known positions (optionally as a function of time) of reference receiver 320 and signal source 305, as well as by comparing CAFs generated for other antenna elements 310 in the array. CAF analysis module 350 uses comparisons of the CAFs generated for antenna elements 310 (i.e., CAFs generated between reference receiver 320 and each antenna element 310) to determine the relative phase delay and amplitude of signals received from the target location and outputted by each antenna element 310. The relative phase delay and amplitude of signals corresponding to the signal source 305 in TDOA/FDOA space outputted by each antenna element 310 is evident by each antenna element's CAF at the same TDOA/FDOA location. The CAF analysis module 350 essentially builds a phase and amplitude response map for the antenna array for signals received from a particular location from analysis of the CAFs corresponding to the array elements 310.

Computational module 340 further includes antenna element adjustment module 355. Antenna element adjustment module 355 provides amplitude adjustment and phase shifting to signals outputted by antenna elements 310 by adjusting tuning elements 365. (Note that computation module provides adjustments to all tuning element 365. Explicit connections between computational module 340 and the two right-hand most tuning elements 365 have been omitted for clarity.) Antenna element adjustment module 355 works in combination with CAF analysis module 350 to determine the phase and amplitude adjustments to antenna elements 310 necessary to constructively add signals received by antenna elements 310 that originate from the geographic location of signal source 305. This is accomplished by phase shifting the signal received by each antenna element 310 by the amount indicated by the CAF analysis module 350 as corresponding to the location of the signal source 305. Additionally, or alternatively, antenna element adjustment module 355 adjusts the amplitude of signals outputted by antenna elements 310. The system of FIG. 3*b* also includes tuning elements 365 that allow phase shifts and/or amplitude adjustments to be applied to signals outputted from antenna elements 310. Tuning elements 365 are in electronic communication with adjustment module 355. In alternative embodiments, where the goal is not to form a beam pointed at a known transmitter location, but rather, to form nulls pointed at sources of interference, antenna element adjustment module 355 directs phase delays to the outputs of antenna elements 310 such that signals received from interference locations are destructively interfered when added.

All of the elements of computational module 340 are in communication with storage 360. Storage 360 comprises computer readable and writeable media. In certain embodiments, storage 360 is a hard disk drive in electronic communication with one or more processors that run processes corresponding to the modules described in reference to FIG. 3*b*. Storage 360 is optionally used to store signal traces and data corresponding to received signals and/or the cross ambiguity functions generated by CAF generation module 345. In certain embodiments, CAF analysis module 350 reads stored CAFs from storage 360. In certain embodiments, CAF analysis module stores data related to the phase and amplitude characteristics of antenna elements 310 in storage 360.

The system of FIG. 3*b* includes integration module 370. Integration module 370 sums the signals received from antenna elements 310 after they have been phase and amplitude adjusted by application to tuning elements 365. In some embodiments, the output of integration module 370 is a signal that results from a beam having been formed by antenna elements 310 pointed at the location of signal source 305.

What has been described above is a general system for determining the response of an antenna array to a signal emanating from a known location by comparing the amplitude and phase of signal peak in a CAF across antenna elements. Once the response of the array has been determined, filters in TDOA-FDOA space can be constructed that amplify or null a signal from the known location. Methods for both amplifying and nulling a signal are disclosed below.

Figure 4:
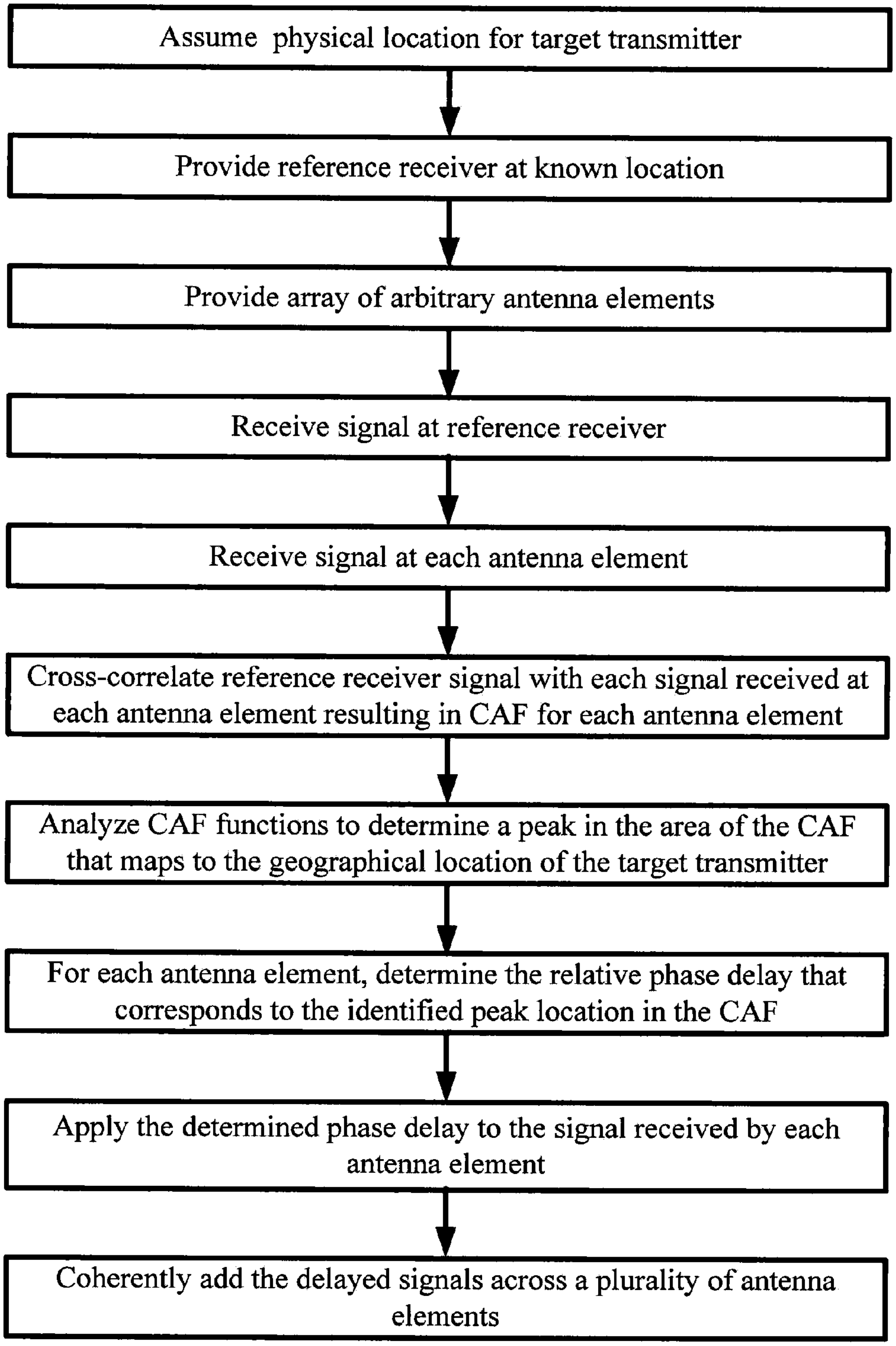
FIG. 4 is a schematic flow diagram showing steps of a method for forming a beam from an adaptive antenna array directed at a particular location according to a method of an embodiment of the invention.

The "on the fly" beam forming method of antenna array elements described above, is shown in FIG. 4. FIG. 4 is a flowchart of a method of detecting an arbitrary signal from a known location according to a method of the invention. In the method of FIG. 4, a physical location for a target transmitter is assumed. A reference receiver is then provided, with a physical location that is well characterized with respect to the assumed physical location of the transmitter. In certain embodiments the reference receiver is in motion with respect to the transmitter location. In other embodiments, the transmitter location is in motion with respect to the reference receiver location.

An array of arbitrary antenna elements is provided. Signals are received by the antenna array elements and the reference receiver. For each antenna element, the signal received at the reference receiver is cross correlated with the signal received at the antenna element resulting in a cross ambiguity function for each antenna element. In certain embodiments, one of the signals is time shifted and/or frequency shifted prior to cross correlation with respect to the other signal. The cross ambiguity function is a 2-dimensional function in FDOA/TDOA space. Peaks in the CAF occur that correspond to signal sources received by both the reference receiver and the antenna element in question. Both the reference receiver and the antenna element are receiving multiple signals from multiple locations, so without further processing or simplifying assumptions, the CAF will not yield useful information. However, since a goal of the method of FIG. 4 is to effectively steer a beam generated by an arbitrary array toward a known location, the physical location of the target transmitter is known, or assumed a priori. The known locations of the target transmitter and the reference receiver are used to determine where in CAF the peak corresponding to the transmitter location occurs in TDOA/FDOA space.

This process is repeated for each antenna element in the array. Once the location of the peak corresponding to the target transmitter location is determined in the CAF functions for each antenna element, the relative phase delay between antenna elements can be determined. This determination is made by selecting a TDOA/FDOA location in the CAF plane corresponding to the targeted transmitter. The CAF magnitude/phase measurements corresponding to the selected TDOA/FDOA location are compared between all the antenna elements. Thus, a comparison of the CAF between antenna elements allows the phase difference between two antenna elements in the receiving array to be measured by computing the phase difference between the target transmitter's signal detected at a point in a first receiving element's CAF and a second receiving element's value at the same point of its CAF. Once the relative phase delays for each antenna element are computed, the signal received by each antenna element is subjected to the computed phase difference and the signals from all antenna elements are added. This has the effect of constructively interfering the signal received by each antenna element that originated from the target transmitter location. The effect of this constructive addition is to cause the signal from target transmitter location to emerge from background noise created by other transmitters in other locations. Equivalently, this constructive addition has the effect of causing the antenna array to form a beam pointed at the target transmitter location.

In like manner, the amplitude ratio of the ambiguity functions determines the amplitude ratio of the signal at any pair of antenna elements. This determination of relative amplitude ratio can be repeated for individual elements or combinations of elements until the amplitude response of the entire array is characterized. At no point in the process does the exact location of any antenna element in the array need to be known—the amplitude and phase response is measured directly from comparisons in the CAFs for the antenna elements.

Accordingly, the matrix of measured differences in the target signal's amplitude and phase of the different antenna outputs is used to compute the complex weights of each elements' receive channel that would maximize the SNR out of the weighted and summed array elements.

This process has the effect forming an antenna beam pointed in the direction of the target signal, even though the array orientation and even the array configuration is unknown and arbitrary. The array gain of such an antenna array increases linearly with the number of array elements as long as the phase of the array elements can be successfully aligned and the signals summed. A 100 element array produces 20 dB of array gain, a 1,000 element array produces 30 dB of array gain, a 10,000 element array produces 40 dB of array gain, etc. In this example, in order to overcome −30 dB at each antenna element, 10,000 elements would be desirable to produce a summed output of 10 dB SNR.

Thus far has been disclosed a method and system for measuring the response of, i.e., calibrate an arbitrary array of receiving elements from a transmitter located at a specific, known geographical location of a potential transmitter using a reference receiver. Based on this measured response, it has been discussed how signals from a known geographical location of a potential transmitter can be coherently summed to dig a signal emanating from the target location, if any, out of surrounding noise. This is equivalent to forming an adaptive beam pointed toward a source of signals. Alternative embodiments of the invention discussed below accomplish similar advantages by actively nulling interference from potential transmitter locations that are not of interest.

In certain embodiments, applicable to some real-world applications, antenna array elements are not distributed in random locations. Some a prioi information may be known about the array. For example, the array might be formed from elements spaced out across a known surface with the only significant uncertainty being an unknown slowly varying phase shift in each receive elements' channel. This situation may occur when an array of inexpensive receivers are phase locked to a common reference, but without knowledge of the initial phase of the local oscillator. Additionally, thermal drift of the receivers' components may occur which may change the gain and phase and therefore impact the processing chain.

In cases such as these, a single interferer arriving from a known direction with a known polarization can be used, in certain embodiments, to calibrate all of the phase offsets of the array. Using the coherent integration methods set forth above, an array may be cross-correlated with a reference collector to locate one or more interferers. If the interfering signal is emitted from a well-defined area and there is clear, line of sight propagation between the interfering transmitter and the array, the cross-correlation method set forth above can be applied in a straightforward manner: simply assume the location of the well-defined area, and calculate the relative phase shifts at each antenna based on the geometry. Alternatively, the measured TDOA and FDOA may be used to determine the location of interference.

Figure 5:
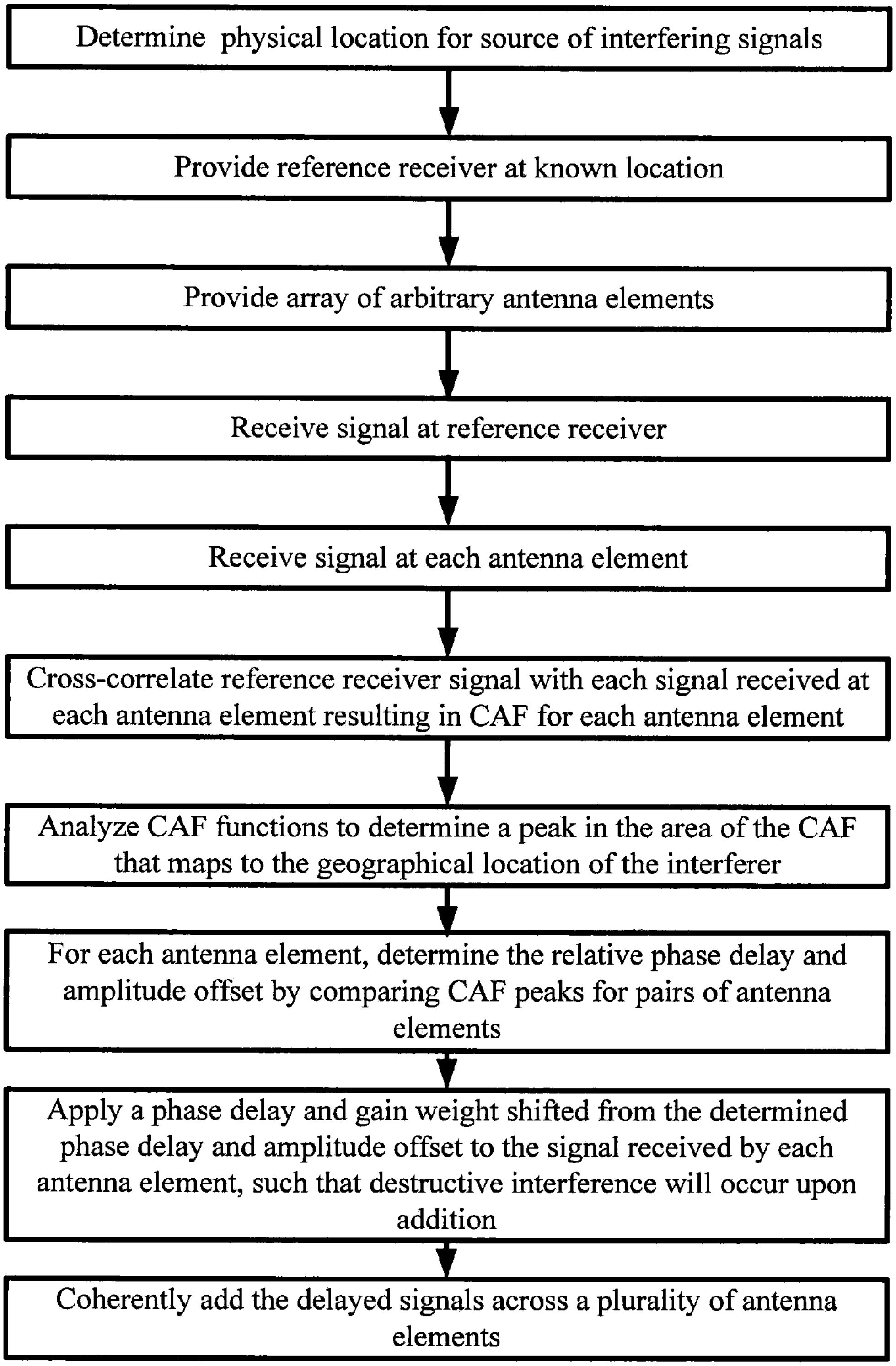
FIG. 5 is a schematic flow diagram showing steps of a method for nulling sources of interference in an adaptive antenna array according to a method of an embodiment of the invention.

FIG. 5 sets forth an exemplary method for nulling a source of interference with an arbitrary array of antenna elements. In the example of FIG. 5, as in the method of FIG. 4, the physical location of source of interference is known or assumed. A reference receiver and an array of antenna elements are provided. A signal is received at the reference receiver and is cross correlated, on an element by element basis, with the signal received at each of the antenna elements generated an array of CAFs for each pair consisting of the reference receiver and an antenna element.

From the known positions of the reference receiver and the source of interference, the region of TDOA/FDOA space corresponding to the location of the interferer is located in each CAF. This region is then compared across the CAFs for each antenna element, resulting in the relative phase delay for a signal received by each antenna element from the source of interference. In the method of FIG. 5, the goal is to destructively interfere the signal received by the antenna elements from the interference source as the outputs from each antenna element are summed. To accomplish this, a phase shift and gain shift is applied to the signal outputted from each antenna element. For a 2-element array, for example, the magnitude of the phase shift is 180 degrees plus the relative phase shift measured by comparing the CAFs across antenna elements, resulting in a 180 relative phase shift between pairs of receivers in the array for signals originating from the target location. The interferer's amplitude from each channel is set to be identical by adjusting the gain between elements until the summed output is minimized. This has the effect of forming a null pointed in the direction of the interference source. After this phase and gain shift is applied, the outputs of the antenna elements are added together and the interfering signal is suppressed.

It should be noted that for an N-element array, there can be N−1 possible independent combinations that product a null in the direction of an interferer. For example, an antenna can be configured to sequentially point a beam at a first transmitter in up to N−1 independent ways and null that transmitter as a source of interference. Sequentially nulling interferers is described below in reference to FIG. 6.

It has been determined in practice that the methods set forth above may be employed sequentially to "dig" signals of interest out of interference produced by other signal sources. In one example, Four 1 MHz bandwidth signals with relative amplitudes of 0 dB, −10 dB, −20 dB, and −26 dB were simulated as being transmitted from 4 different locations that were not known a priori. They were received by a fixed receive array containing eight elements spaced one-half wavelength apart and by a moving collection platform with one element. The geometry was such that the four signals arrived with TDOA equal zero and four different values of FDOA.

A cross-ambiguity function (CAF) was generated between the moving receiver and one element of the array. The strongest signal was apparent in the CAF display, but the weaker signals were obscured by the CAF-sidelobes of the strong signal. The coherent integration time could have been increased to reduce the strong signals' sidelobe levels relative to the weaker CAF peaks, but we chose a different approach.

The TDOA and FDOA of the strongest signal in the CAF were measured, and the complex cross-correlation at this TDOA/FDOA was computed between the moving receiver and each of the eight array elements. These eight complex measured values were sufficient to combine the eight array elements in seven different ways, each of which had a spatial null in the direction of the strong signal. The result was seven different "blocking beams", each of which had a null in the direction of the strongest interferer.

One of these beams was selected and a new CAF function computed between it and the moving receiver. The original strong signal and its sidelobes were missing from this new CAF. The result was that the next weaker signal could be seen in the CAF.

Measurements of the complex cross-correlation at the second signal's TDOA/FDOA value were then be used to combine the seven original blocking beams to "block" the second strongest signal. It was possible to form six new blocking beams with nulls in the directions of the two strongest signals. This process was repeated again to "block the third strongest signal. The weakest signal was then visible as a peak in the ambiguity function.

In many cases multiple CAF peaks, each corresponding to a different signal, may be visible after a CAF computation. Measurement of the complex correlation corresponding to each specific peak's TDOA/FDOA will allow multiple signals to be simultaneously geolocated (based on TDOA/FDOA values). Beams may also be formed in with multiple nulls directed at all undesired signals. This can be done in one step rather than sequentially as described above. If N elements are used to null M interferers arriving from different directions, then blocking beams with M nulls are formed. When a new CAF is formed between the moving collector and the new blocking beams, the blocked interferers will be suppressed. At this point, additional weak CAF peaks resulting from initially obscured signals may be visible. This illustrates that under certain circumstances, iterative nulling may be useful, but more than one interferer may be nulled in each iteration.

Finally it is useful to note that the pattern of the blocking beams, although sharing common null locations, may otherwise vary greatly. One blocking beam may have a peak pointed at a particular signal (not yet blocked) while another beam may have less gain, or even a null pointed at the same signal. So when trying to detect a weak signal, it may be useful to form multiple CAF functions corresponding to the moving collector cross-correlated with multiple blocking beams.

Figure 6:
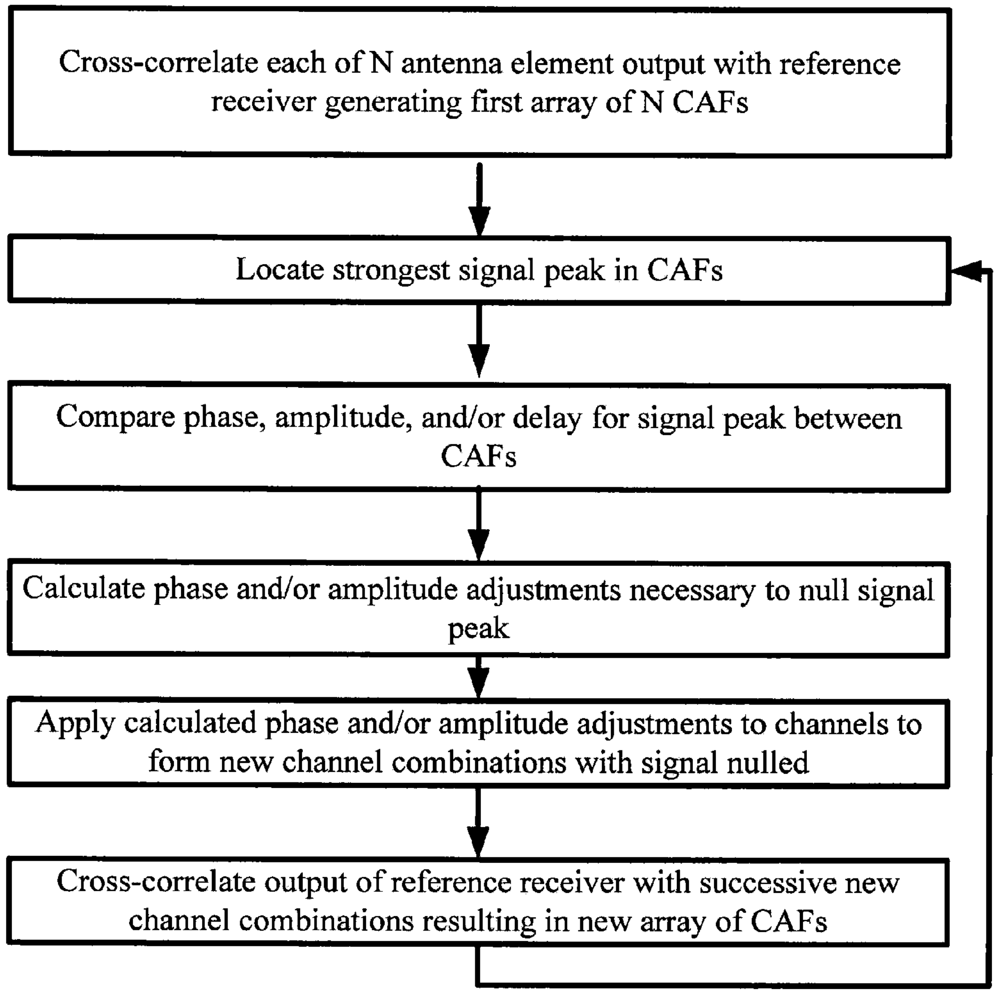
FIG. 6 is a schematic flow diagram showing steps of a method for sequentially nulling multiple sources of interference according to an embodiment of the invention.

The sequential nulling method discussed above is depicted more generally in FIG. 6. The method of FIG. 6 assumes the arrangement set forth above, i.e., an array of antenna elements and a reference receiver. Thus far, the discussion has been focused on transmitters and sources of interference that are easily resolvable in TDOA-FDOA space, which allows them to be easily amplified or nulled. A situation may occur where there are multiple interfering signals at a particular location that cannot be easily resolved in TDOA-FDOA space. To deal with such a situation, the method of FIG. 6 may be applied. The method of FIG. 6 assumes the arrangement set forth above, i.e., an array of antenna elements and a reference receiver. In the method of FIG. 6, a CAF is generated between the output of each antenna element and the reference receiver generating an array of N CAFs for N antenna elements. The strongest peak in the CAFs is then identified. The relative phase and amplitude of the identified peak is determined across CAFs and a phase and gain shift is calculated for each antenna element that will result in a null directed at the selected peak. This calculated gain and phase shift is applied to the antenna element outputs, which will have the effect of cancelling signal received from the strongest interferer when the antenna outputs are summed.

The process is then repeated, except instead of cross-correlating the antenna elements with the reference receiver, combinations of the outputs of the antenna elements are cross correlated. This generates a new array of N−1 CAFs where the previously strongest interferer has been cancelled. The next strongest interferer is then located and the process is repeated to null that interferer. Continued iteration allow for a total of N−1 degrees of freedom for an array having N elements. Importantly the process shown in FIG. 6 may be repeated until degrees of freedom are exhausted. For N antenna elements, N−1 beams or nulls may be generated according to the method of FIG. 6. This method may be used, for example, to cancel N−2 interferers and amplify a remaining signal.

For the methods set forth above, as long as the signal and/or interference can be characterized in TDOA/FDOA space, the techniques set forth can be applied. Two situations are of particular interest in this regards. First, the signal of interest or source of interference may be strong enough to be detected and tracked in TDOA/FDOA space. In this case, it is not even necessary to know the precise location of the signal or interference source. Second, the signal of interest or source of interference may be moving, and its motion may be determined by some other means about from signal observation. For example, a TV camera or other image data may provide information about the signal source's position over time. This motion can be used to determine the region in the CAF that corresponds to the signal source, which allows for the "on the fly" characterization of an antenna array to be performed according to the methods set forth above.

The method of sequentially nulling interference that has been described above with respect to FIG. 6 is particularly useful for "digging" a particular signal out interference. Under this method, multiple nulls are formed in the direction of sources of interference until a signal peak of interest becomes resolvable in TDOA-FDOA space. Once a peak of interest is identified according to this method, a beam may be formed in the direction of the peak so it may be received. Alternatively or additionally, once a peak of interest is identified according to this method, it may be geolocated, for example, according to the methods described in co-pending application Ser. No. 12/542,541, by computing the area in physical space that maps to the area in TDOA-FDOA space that includes the revealed peak.

In certain embodiments, individual steps recited above in connection with FIGS. 4, 5 and 6 may be combined, eliminated, or reordered. In certain embodiments, instructions for performing the steps recited with respect to FIGS. 4, 5 and 6 are encoded in computer readable medium, for example, computer readable medium 360 described above with respect to FIG. 3, wherein those instructions are executed by a processor, for example computational module 340, to implement the methods of FIGS. 4, 5 and 6.

In other embodiments, the invention includes instructions residing in any other computer program product, where those instructions are executed by a computer external to, or internal to, a data storage system, to implement the methods set forth with respect to FIGS. 4 and 5. In either case, the instructions may be encoded in computer readable medium comprising, for example, a magnetic information storage medium, an optical information storage medium, an electronic information storage medium, and the like. "Electronic storage media," may mean, for example and without limitation, one or more devices, such as and without limitation, a PROM, EPROM, EEPROM, Flash PROM, compactflash, smartmedia, and the like.

The invention has been primarily described for simplicity as a fixed array and a single-element moving collector receiving fixed transmitters. In fact, any combination of reference collector, array, and transmitter motion is allowed. It should also be noted that it is possible for both collectors to be composed of arrays of elements.

While one or more embodiments of the present invention have been illustrated in detail, the skilled artisan will appreciate that modifications and adaptations to those embodiments may be made without department from the scope of the present invention as set forth in the following claims.

We claim:

1. A method of characterizing the response of an antenna array having a plurality of antenna elements, comprising:
- providing a reference receiver;
- receiving a signal at said reference receiver;
- receiving a signal at each of said plurality of antenna elements;
- computing a cross-ambiguity function between the reference receiver and each antenna element resulting in an array of cross-ambiguity functions;
- identifying a region in each of said cross-ambiguity functions of said array corresponding to a source of signals; and
- analyzing said region in each of said cross-ambiguity functions of said array to determine the relative phase and gain response of said plurality of antenna elements.

2. The method of claim 1, further comprising subjecting the signal received at said reference receiver to a frequency shift or delay prior to computing a cross-ambiguity function between the reference receiver and each antenna element.

3. The method of claim 1, wherein said step of identifying a region in each of said cross-ambiguity functions of said array corresponding to a source of signals is based on data regarding the physical location of a source of signals.

4. The method of claim 1, wherein the location and motion of said reference receiver and said antenna array are known.

5. A method of adjusting an antenna having a plurality of antenna elements, comprising:
- providing a reference receiver;
- receiving a signal at said reference receiver;
- receiving a signal at each of said plurality of antenna elements;
- computing a cross-ambiguity function between the reference receiver and each antenna element resulting in an array of cross-ambiguity functions;
- identifying a region in each of said cross-ambiguity functions of said array corresponding to a source of signals;
- analyzing said region in each of said cross-ambiguity functions of said array to determine the relative phase and gain response of said plurality of antenna elements;
- based on said analyzing step; computing phase and gain adjustments to apply to the signals received at each of said plurality of antenna elements; and
- applying said computed phase and gain adjustments to apply to the signals received at each of said plurality of antenna elements.

6. The method of claim 5, further comprising subjecting the signal received at said reference receiver to a frequency shift or delay prior to computing a cross-ambiguity function between the reference receiver and each antenna element.

7. The method of claim 5, wherein said step of identifying a region in each of said cross-ambiguity functions of said array corresponding to a source of signals is based on data regarding the physical location of a source of signals.

8. The method of claim 5, further including the step of summing the signals received at each of said plurality of antenna elements.

9. The method of claim 5, wherein said computed phase and gain adjustments result in constructive interference for a signal from said source of signals when the signals received at each of said plurality of antenna elements are summed.

10. The method of claim 5, wherein said computed phase and gain adjustments result in destructive interference for a signal from said source of signals when the signals received at each of said plurality of antenna elements are summed.

11. The method of claim 5, wherein said computed phase and gain adjustments result in a beam pointed in the direction of said source of signals.

12. The method of claim 5, wherein said computed phase and gain adjustments result in a null pointed in the direction of said source of signals.

13. The method of claim 5, wherein location and motion of said reference receiver and said antenna array are known.

14. The method of claim 13, wherein either said reference receiver or said plurality or antenna elements is moving along a known path with respect to said source of signals.

15. A method of iteratively nulling interference with an antenna array having a plurality of antenna elements, comprising:

providing a reference receiver;

computing a first set of cross-ambiguity functions between said reference receiver and each of said antenna elements;

analyzing said cross-ambiguity functions to distinguish a first interfering signal peak present in all cross-ambiguity functions;

analyzing said first distinguished peak in each of said cross-ambiguity functions to determine the relative phase and gain response of said plurality of antenna elements;

based on said analyzing step; computing phase and gain adjustments to apply to the signals received at each of said plurality of antenna elements; and applying said computed phase and gain adjustments to apply to the signals received at each of said plurality of antenna elements such that a null is formed in the direction of the first distinguished peak;

computing a second set of cross-ambiguity functions between any combination of antenna elements having a null directed at the first interferer.

16. The method of claim 15, further comprising analyzing said second set cross-ambiguity functions to distinguish a second interfering signal peak present in all cross-ambiguity functions;

analyzing said second distinguished peak in each of said cross-ambiguity functions to determine the relative phase and gain response of said plurality of antenna elements;

based on said analyzing step; computing phase and gain adjustments to apply to the signals received at each of said plurality of antenna elements; and applying said computed phase and gain adjustments to apply to the signals received at each of said plurality of antenna elements such that a null is formed in the direction of the second distinguished peak.

17. The method of claim 15, further comprising:

computing a third set of cross-ambiguity functions between said reference receiver and each combination of said antenna elements having nulls in the direction of the first and second interferers;

analyzing said cross-ambiguity functions to distinguish a signal of interest peak present in all cross-ambiguity functions;

analyzing said distinguished signal of interest in each of said cross-ambiguity functions to determine the relative phase and gain response of said plurality of antenna elements;

based on said analyzing step; computing phase and gain adjustments to apply to the signals received at each of said plurality of antenna elements; and applying said computed phase and gain adjustments to apply to the signals received at each of said plurality of antenna elements such that a beam is formed in the direction of the signal of interest peak while nulling interference.

18. The method of claim 15, further comprising subjecting the signal received at said reference receiver to a frequency shift or delay prior to computing a cross-ambiguity function between the reference receiver and each antenna elements.

19. The method of claim 15, wherein the location and motion of said reference receiver and said antenna array are known.

20. The method of claim 19, wherein either said reference receiver or said plurality of antenna elements is moving along a known path with respect to said source of signals.

21. A method of geolocating a source of signals with an antenna array having a plurality of antenna elements, comprising:

providing a reference receiver;

computing a first set of cross-ambiguity functions between said reference receiver and each of said antenna elements;

analyzing said cross-ambiguity functions to distinguish a first interfering signal peak present in all cross-ambiguity functions;

analyzing said first distinguished peak in each of said cross-ambiguity functions to determine the relative phase and gain response of said plurality of antenna elements;

based on said analyzing step; computing phase and gain adjustments to apply to the signals received at each of said plurality of antenna elements; and applying said computed phase and gain adjustments to apply to the signals received at each of said plurality of antenna elements such that a null is formed in the direction of the first distinguished peak;

computing a second set of cross-ambiguity functions between any combination of antenna elements having a null directed at the first interferer analyzing said second set cross-ambiguity functions to distinguish a second signal peak present in all cross-ambiguity functions analyzing the TDOA and FDOA of said second peak to determine its geographical location.

* * * * *